(12) United States Patent
Richards

(10) Patent No.: US 7,818,034 B2
(45) Date of Patent: Oct. 19, 2010

(54) MULTI-MODE PIVOTING CARRYING HOLDER FOR MOBILE DEVICES

(75) Inventor: Scott H. Richards, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 805 days.

(21) Appl. No.: 11/694,722

(22) Filed: Mar. 30, 2007

(65) Prior Publication Data
US 2008/0242382 A1   Oct. 2, 2008

(51) Int. Cl.
*H04M 1/00* (2006.01)

(52) U.S. Cl. ............. 455/575.1; 455/550.1; 455/90.3; 379/447; 379/455

(58) Field of Classification Search ........... 455/424, 455/425, 456.5, 456.6, 561, 550.1, 575.1, 455/575.8, 566, 90.3, 556.2, 346, 347, 348, 455/349; 379/466, 447, 448, 451, 446, 433.01, 379/433.08–433.13; 224/236, 269, 197, 224/241; 439/345, 346
See application file for complete search history.

(56) References Cited

U.S. PATENT DOCUMENTS

| | | | | |
|---|---|---|---|---|
| 4,479,596 A * | 10/1984 | Swanson | ............. | 224/236 |
| 5,097,997 A * | 3/1992 | Kipnis et al. | ............. | 224/269 |
| 5,267,123 A * | 11/1993 | Boothroyd et al. | ........ | 361/679.09 |
| 5,666,273 A | 9/1997 | Kurcbart | | |
| 5,803,323 A * | 9/1998 | Hayashi et al. | ............ | 224/241 |
| 5,995,622 A * | 11/1999 | Roussy et al. | ............. | 379/446 |
| 6,594,472 B1 * | 7/2003 | Curtis et al. | ............. | 455/575.8 |
| 6,612,432 B2 * | 9/2003 | Motson | ............. | 206/305 |
| 7,099,710 B1 * | 8/2006 | Faillance | ............. | 455/575.8 |
| 7,366,555 B2 * | 4/2008 | Jokinen et al. | ............. | 455/575.8 |
| 2001/0040109 A1 * | 11/2001 | Yaski et al. | ............. | 206/320 |
| 2002/0139822 A1 * | 10/2002 | Infanti | ............. | 224/197 |
| 2003/0029976 A1 * | 2/2003 | Saitoh et al. | ............. | 248/226.11 |
| 2005/0181745 A1 * | 8/2005 | Wood et al. | ............. | 455/90.3 |
| 2006/0022022 A1 * | 2/2006 | Bowman | ............. | 229/116.5 |

(Continued)

FOREIGN PATENT DOCUMENTS

JP    05300071 A    11/1993

(Continued)

OTHER PUBLICATIONS

PCT International Search Report Application No. PCT/US2008/056637 Dated Jun. 30, 2008—10 Pages.

*Primary Examiner*—Duc Nguyen
*Assistant Examiner*—Charles Chow
(74) *Attorney, Agent, or Firm*—Barbara R. Doutre

(57) ABSTRACT

A holster or carry holder (100) for a mobile device (150) forms an assembly or combination (200) that includes a first housing (102) and a second housing (112) pivotably coupled to the first housing. The second housing can receive and carry the mobile device in at least a first position or closed position (FIG. 2) enabling access to a top mounted interface on the mobile device. The second housing can further pivot about a pivot point (108) to a second position substantially orthogonal to the first position enabling access to both the top interface and to a rear interface of the mobile device. The first housing can include a retention tab (104) on a top portion of the first housing for retaining the mobile device within the carry holder. The carry holder can further include a belt clip (106) coupled to the first housing.

10 Claims, 4 Drawing Sheets

U.S. PATENT DOCUMENTS

| | | | |
|---|---|---|---|
| 2007/0060224 A1* | 3/2007 | Liu | 455/575.8 |
| 2007/0191070 A1* | 8/2007 | Rao | 455/566 |
| 2008/0090443 A1* | 4/2008 | Ackloo | 439/346 |

FOREIGN PATENT DOCUMENTS

| | | |
|---|---|---|
| KR | 2019940008805 U | 4/1994 |
| KR | 201998019513 U | 7/1998 |
| KR | 1020030086212 A | 11/2003 |

* cited by examiner

MULTI-MODE PIVOTING CARRYING HOLDER FOR MOBILE DEVICES

FIELD

This invention relates generally to carry holders or holsters, and more particularly to a pivoting carry holder used for mobile devices.

BACKGROUND

Typical holsters for portable belt worn devices make viewing of displays difficult on either the front or rear side of the device without removing the device from the belt. In the context of public safety users who often require to perform various tasks simultaneously, such a scenario creates a potential source of annoyance or danger. Such tasks such as handling a firearm while keeping a suspect within view often do not allow a free hand to remove and view information on a belt worn radio or data device.

Meanwhile, two-sided or multi-sided devices have developed in the industry that may include an audio, visual, or tactile user interface on each side of the device. As a result, such multi-sided devices have in many instances eliminated an unused area previously available for mounting belt clip brackets or attachment features. Thus, more and more multi-sided devices use holsters that have belt clips on the holsters. Another trend that further exasperates the public safety user's experience is the trend towards having the display facing inward on the user's belt since large alphanumeric/video displays on portable devices are more prone to damage if they are worn facing outward on the user's belt. This combination of factors have made it difficult for enabling a hands-free or substantially hands-free solution for users of multi-sided products having displays and keypads or other tactile or visual features. While some existing carry holders protect the portable device adequately, they typically fail to pivot or provide compatibility for two-sided products and further fail to enable hands-free accessibility from a belt worn carry holder or holster.

SUMMARY

Embodiments in accordance with the present invention can provide a holster or carry holder that facilitates hands-free visual or tactile accessibility for multi-sided electronic products such as two-way radios.

In a first embodiment of the present invention, a multi-mode pivoting carry holder for a mobile device can include a first housing for mounting to a person's body, and a second housing pivotably coupled to the first housing where the second housing receives and carries the mobile device in at least a first position enabling access to a top mounted interface on the mobile device and further pivots to a second position substantially orthogonal to the first position enabling access to both the top interface and to a rear interface of the mobile device. The first housing can further include a retention tab on a top portion of the first housing for retaining the mobile device within the carry holder and for retaining the mobile device in the first position. The carry holder can further include a belt clip coupled to the first housing. The second housing can further include audio port vents or a slot on a bottom portion of the second housing to enable finger biased removal of the mobile device. The carry holder can further include a detent stop feature enabling the second housing to pivot at least partially toward the second position after the retention tab releases the mobile device. The carry holder can further include an aperture on the top portion of the second housing enabling retention of the mobile device and access to the top mounted interface. Note, the mobile device can be a clipless radio having a speaker on a front side, a display and keypad on a rear side and a plurality of top mounted controls on the top interface.

In a second embodiment of the present invention a multi-mode pivoting carry holder for a clipless mobile device having at least a speaker on a front side and a display and keypad on a rear side can include a first housing having a belt clip for mounting to a person's body, and a second housing pivotably coupled to the first housing where the second housing receives and carries the clipless mobile device in at least a first position enabling access to a top mounted interface on the mobile device and further pivots to a second position substantially ninety (90) degrees from the first position enabling tactile and visual access to both the top mounted interface and to the display and keypad on the rear side of the mobile device. The first housing further includes a retention tab on a top portion of the first housing for retaining the mobile device within the carry holder and for retaining the mobile device in the first position. The second housing further includes audio port vents that cover the speaker on the front side of the mobile device. The second housing can further include a slot on a bottom portion of the second housing to enable finger biased removal of the mobile device from the carry holder. The carry holder can further include a detent stop feature enabling the second housing to pivot at least partially toward the second position after the retention tab releases the mobile device. The carry holder can further include an aperture on the top portion of the second housing enabling retention of the mobile device and access to top mounted interface.

In a third embodiment of the present invention, a holster for carrying an electronic product having at least a display and keypad on a rear side of the electronic product can include a first housing having a mounting mechanism for mounting to a person's body and a second housing pivotably coupled to the first housing where the second housing receives and carries the electronic product securely in at least a first position enabling access to a top mounted interface on the electronic product and further pivots to a second position substantially ninety (90) degrees from the first position enabling tactile and visual access to both the top mounted interface and to the display and keypad on the rear side of the electronic product. The first housing cab further include a retention tab on a top portion of the first housing for retaining the electronic product within the holster and for retaining the electronic product securely in the first position. The holster can further include an aperture on the top portion of the second housing enabling retention of the electronic device and visual and tactile access to top mounted controls of the electronic device. The second housing can further include an audio port vent that provides a port for a speaker on a front side of the electronic product. The second housing can further include a slot on a bottom portion of the second housing enabling finger biased removal of the electronic product whenever the holster is outside of the first position. The holster can further include a detent stop feature enabling the second housing to pivot at least partially toward the second position after the retention tab releases the electronic product.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

DETAILED DESCRIPTION OF THE DRAWINGS

Figure 1:
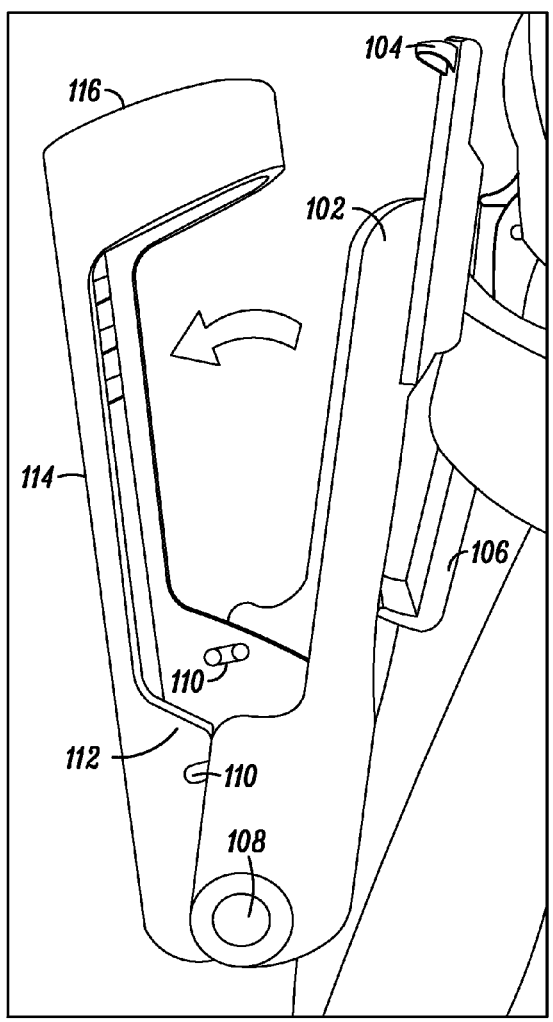
FIG. 1 is a side view illustration of a holster (without a portable device) in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways to provide a holster or carry holder for a portable or mobile device or product such as a two-way radio that provides hands-free or substantially hands-free accessibility to the features of the mobile device while still being retained within the holster.

Figure 2:
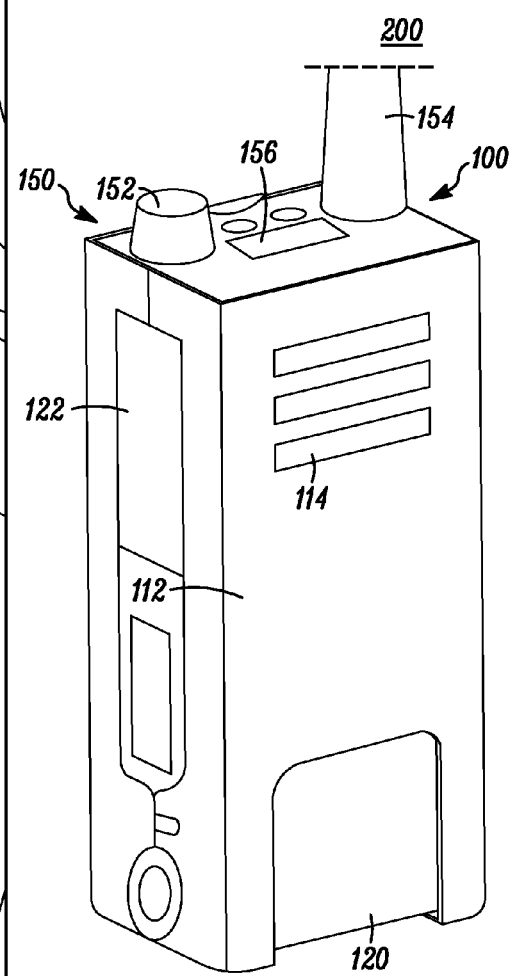
FIG. 2 is a perspective view of the holster of FIG. 1 carrying a portable device in accordance with an embodiment of the present invention.

Referring to FIGS. 1 and 2, a holster or carry holder 100 for a mobile device 150 is shown forming an assembly or combination 200. The holster 100 can include a first housing 102 for mounting to a person's body (such as a belt or waist band), and a second housing 112 pivotably coupled to the first housing 102. The second housing 112 can receive and carry the mobile device 150 in at least a first position or closed position (as shown in FIG. 2) enabling access to a top mounted interface on the mobile device 150. The top mounted interface can include volume or channel selection switches 152 and a display 156 for example.

The second housing 112 can further pivot about a pivot point 108 to a second position substantially orthogonal to the first position (shown in another embodiment in FIG. 11) enabling access to both the top interface and to a rear interface of the mobile device. The first housing 102 can further include a retention tab 104 on a top portion of the first housing 102 for retaining the mobile device 150 within the carry holder 100 and for retaining the mobile device 150 in the first position. The carry holder can further include a belt clip 106 coupled to the first housing 102. The second housing 112 can further include audio port vents 114 and optionally a slot 120 on a bottom portion of the second housing 112 to enable finger biased removal of the mobile device once the holster is out of a closed position. The carry holder 100 can further include a detent stop feature 110 enabling the second housing 112 to pivot at least partially toward the second position to an intermediate position as shown in FIG. 1 after the retention tab 104 releases the mobile device 150.

The carry holder 100 can further include an aperture 116 on the top portion of the second housing 112 enabling retention of the mobile device and access to the top mounted interface. The aperture 116 along with the bottom of the second housing 112 can form a pocket for retaining the mobile device 150. The carry holder 100 can also form an open area 122 as shown in FIG. 2 to enable access to side controls on the mobile device. A side control for example can be a push-to-talk button or side volume control. Note further that the mobile device 150 can be a clipless radio (e.g., two-way radio, cellular phone, or smart phone) having a speaker on a front side (that faces the audio port vents 114 when placed in the holster 100), a display and keypad on a rear side (that can face back towards the first housing 102 to provide added protection to the display and keypad) and a plurality of top mounted controls on the top interface. The mobile device 150 can also optionally include an antenna 154 that typically protrudes from the top interface area. Of course, other mobile devices can include an internal antenna that obviates the need for an external antenna.

Figure 3:
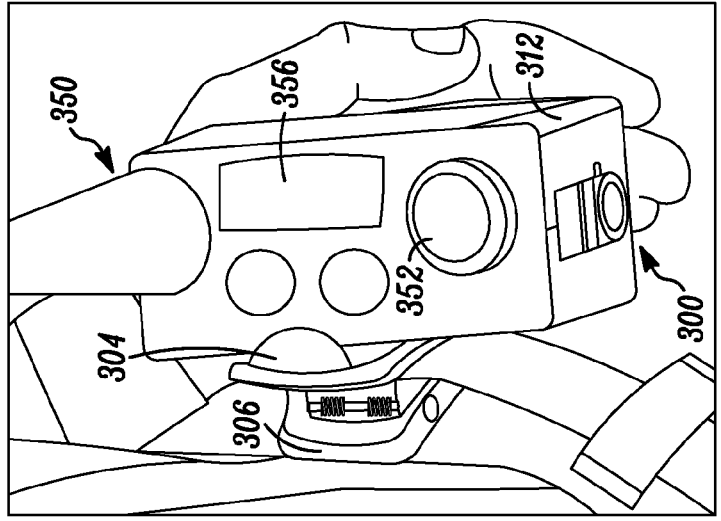
FIG. 3 is a top view of a holster in a first or closed position in accordance with an embodiment of the present invention.
Figure 8:
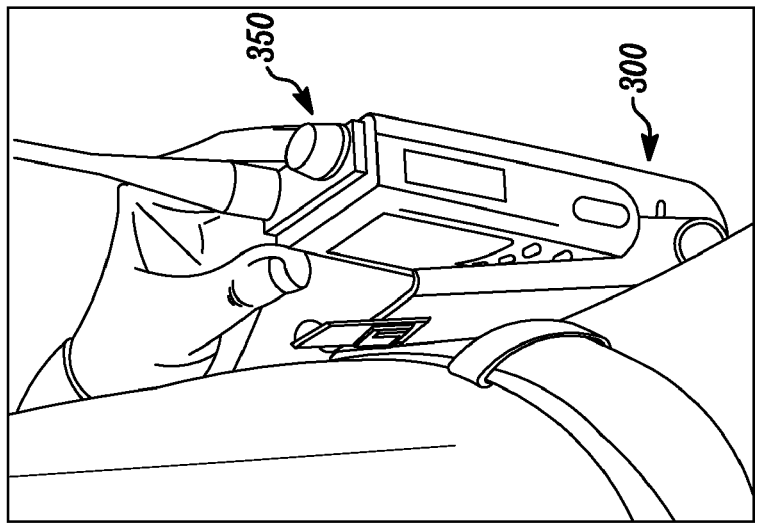
FIG. 8 is a side view of the holster of FIG. 3 in an open or pivoted or intermediate position after re-insertion and in motion to place the portable device back in a secure or first position in accordance with an embodiment of the present invention.
Figure 7:
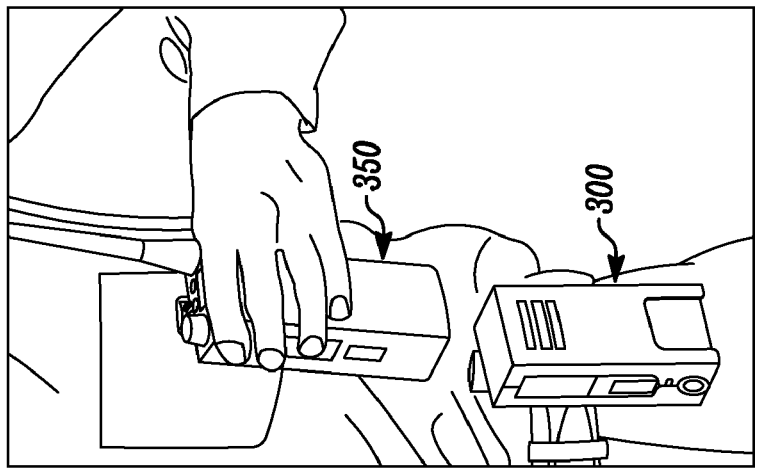
FIG. 7 is a side view of the holster of FIG. 3 in an open or pivoted or intermediate position while the portable device is being re-inserted into the holster in accordance with an embodiment of the present invention
Figure 9:
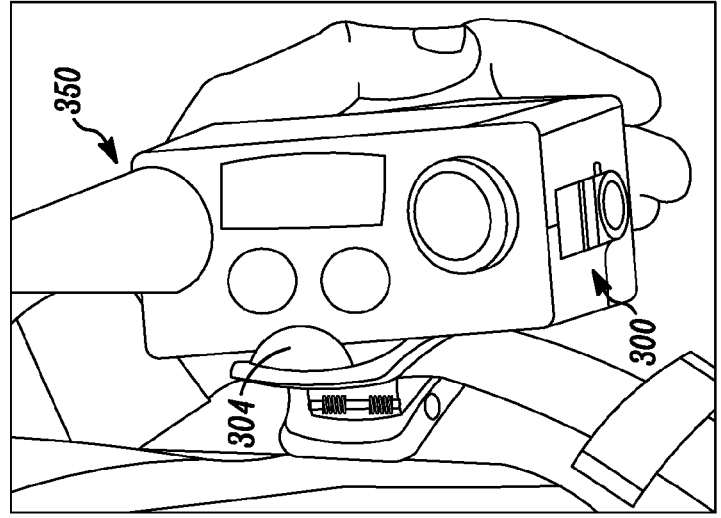
FIG. 9 is a top view of a holster in a first or closed position again in accordance with an embodiment of the present invention.

Referring to FIGS. 3-11, an assembly or combination 400 is shown that is similar to the assembly or combination 200 of FIGS. 1-2. The combination 400 includes a holster or carry holder 300 that holds a portable or mobile device 350. As in the prior embodiment, the holster 300 can include a first housing 302 for mounting to a person's body, and a second housing 312 pivotably coupled to the first housing 302. The second housing 312 can receive and carry the mobile device 350 in at least a first position or closed position (as shown in FIGS. 3 and 9) enabling access to a top mounted interface on the mobile device 350. The top mounted interface can include volume or channel selection switches 352 and a display 356 for example.

Figure 5:
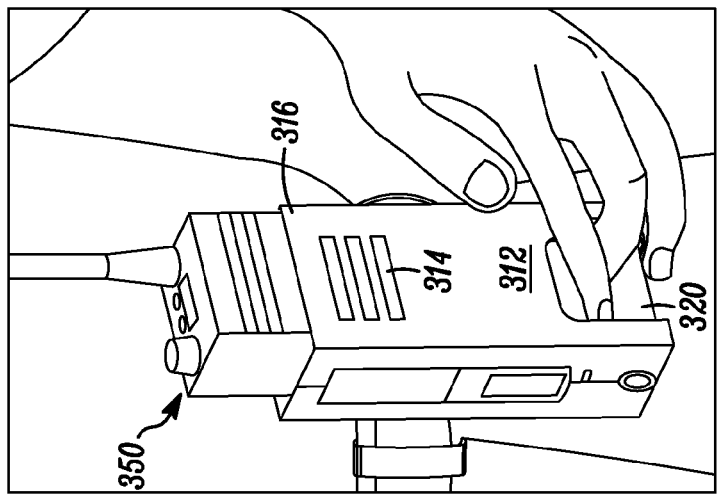
FIG. 5 is a side view of the holster of FIG. 3 in an open or pivoted or intermediate position showing a user pushing removing the portable device via a slot in accordance with an embodiment of the present invention
Figure 4:
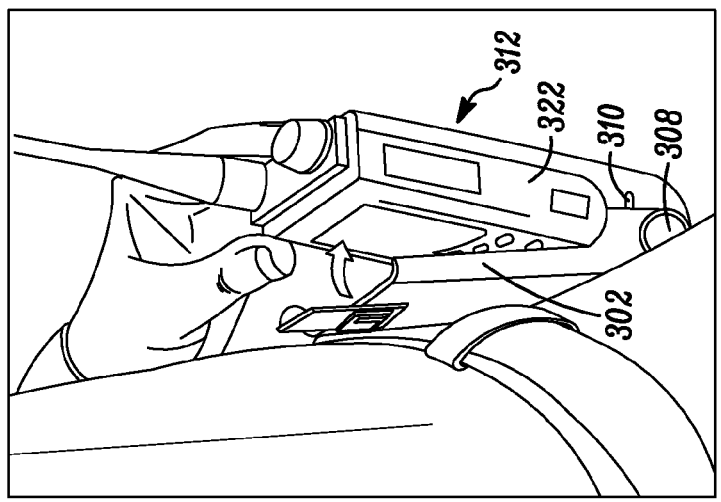
FIG. 4 is a side view of the holster of FIG. 3 in an open or pivoted or intermediate position in accordance with an embodiment of the present invention.
Figure 10:
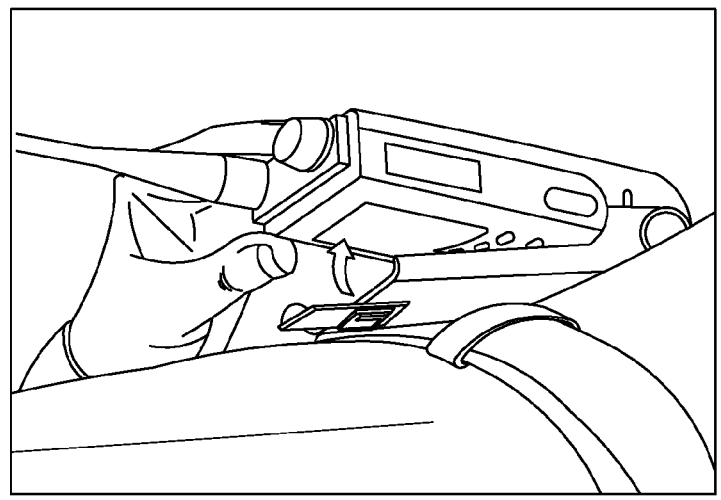
FIG. 10 is a side view of the holster of FIG. 3 in an open or pivoted or intermediate position in accordance with an embodiment of the present invention.

The second housing 312 can further pivot about a pivot point 308 to a second position substantially orthogonal or substantially 90 degrees to the first position (shown in another embodiment in FIG. 11) enabling access to both the top interface and to a rear interface of the mobile device. Of course, the second housing 312 can pivot to intermediate positions as well between the first and second position. The first housing 302 can further include a retention tab 104 on a top portion of the first housing 302 for retaining the mobile device 350 within the carry holder 300 and for retaining the mobile device 350 in the first position. The carry holder can further include a belt clip 306 coupled to the first housing 302. The second housing 312 can further include audio port vents 314. The second housing can include a slot 320 (as best illustrated in FIG. 5) on a bottom portion of the second housing 312 to enable finger biased removal of the mobile device once the holster is out of a closed position. In other words, the mobile device 350 can be released from the carry holder 300 by releasing the retainer tab 304 and pivoting the mobile device 350 away from the first position as shown in FIGS. 4-8 and 10 and 11. The carry holder 300 can further include a detent stop feature 310 enabling the second housing 312 to pivot at least partially toward the second position to an intermediate position as shown in FIGS. 4, 8 and 10 after the retention tab 104 releases the mobile device 350.

Figure 11:
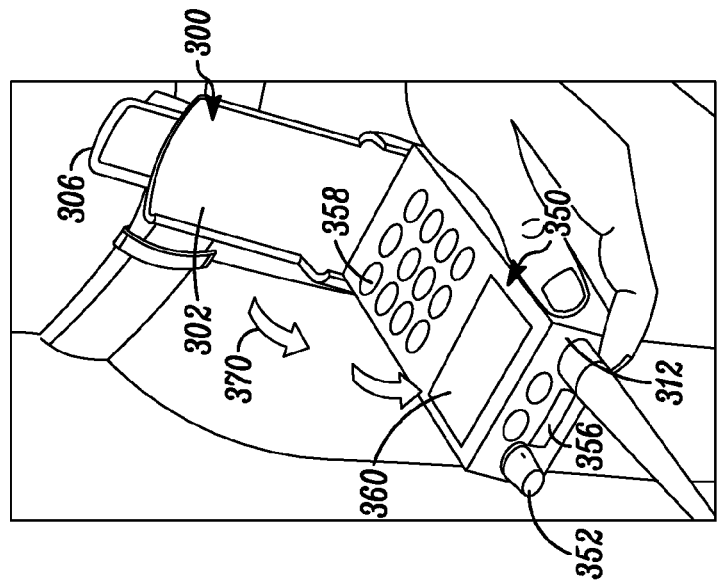
FIG. 11 is a side view of the holster of FIG. 3 in a fully open or second position showing the holster and mobile device in a hands-free or substantially hands-free mode accordance with an embodiment of the present invention.

The carry holder 300 can further include an aperture 316 on the top portion of the second housing 312 enabling retention of the mobile device and access to the top mounted interface. The aperture 316 along with the bottom of the second housing 312 can form a pocket for retaining the mobile device 350. The carry holder 300 can also form an open area 322 as shown in FIG. 4 to enable access to side controls on the mobile device. As mentioned previously, the mobile device 350 can be a clipless radio (e.g., two-way radio, cellular phone, or smart phone) having a speaker on a front side (that faces the audio port vents 314 when placed in the holster 300), a display 360 and keypad 358 on a rear side as shown in FIG. 11 (that can face back towards the first housing 302 to provide added protection to the display 360 and keypad 358) and a plurality of top mounted controls on the top interface.

Figure 6:
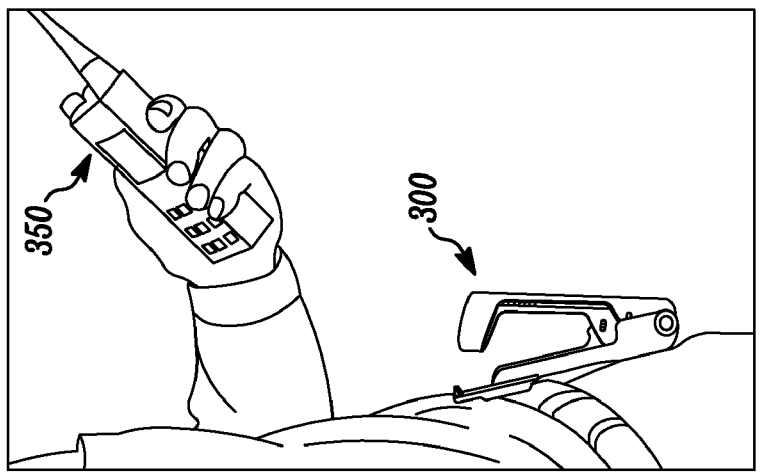
FIG. 6 is a side view of the holster of FIG. 3 in an open or pivoted or intermediate position while the portable device is in hand use in accordance with an embodiment of the present invention.

Operationally, the holster 300 can incorporate a pivoting pocket formed either at the bottom of the housing 312 alone or in combination with a retaining aperture 316. The pivoting pocket can have specifically spaced detent stops using the detent stop feature 310 incorporated into the holster 300. When a mobile or portable device 350 such as a two-way radio is placed in the pivoting pocket, it can be secured into place as the pivoting pocket is closed using the retention tab 304. When the pocket is opened, the mobile device 350 is freely removed by the user (as illustrated in FIGS. 5 and 6). Further rotation of the pocket pivot will expose the display 360 and keypad 358 of the portable device 350 without requiring the user to remove the portable device 350 from the holster 300 as illustrated in FIG. 11. The capability demonstrated in FIG. 11 can enable a user to reference information on the display 360 without dedicating a hand to hold the mobile device 350. In other words, the display and keypad are visually accessible to the user without requiring a hand to hold the holster 300 or mobile device 350. Furthermore, such capability further enables tactile accessibility allowing a user to press buttons without necessarily requiring an additional hand. A user can access and press buttons with a single hand if needed when the holster and mobile device is in the second position.

When viewing or other actions are completed or when the user demands a sudden task change, the pivoting carry holder 300 and mobile device 350 can be immediately closed and secured with a single hand motion. This allows the user to reduce physical task overload in high-stress situations.

Although the holster 100 or 300 is designed to secure a mobile device 150 or 350 with the display (360) facing inward or toward the user while on the belt, the embodiments herein are not necessarily limited to such arrangement. The rear interface on the mobile device 350 can include a display or keypad or other components and not necessarily limited to any particular arrangement. The holster 100 or 300 will generally provide visual or tactile access to the user regardless of what the rear interface includes. Nonetheless, the orientation in the embodiments shown normally preclude viewing the main display (or rear interface generally) without first removing the radio or mobile device. However, the pivoting pocket as illustrated in the various embodiments allows the mobile device to tilt forward and thereby expose the display or other alternative or optional components on the rear interface of the mobile device as needed.

The various embodiments and arrangements herein also enable the firm attachment of the mobile device to the belt, pant waistline or other area on a person's body in spite of having no dedicated belt clip feature on the mobile device itself. The absence of a belt clip feature on the mobile device itself allows all planes of the mobile device to be used for visual, tactile, or audio interface elements providing greater design flexibility for such mobile devices.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A multi-mode pivoting carry holder for a mobile device, comprising:
   a first housing for mounting to a person's body via a belt clip;
   a second housing pivotably coupled to the first housing, wherein the second housing receives the mobile device through a top opening aperture and carries the mobile device in at least a first position enabling unobstructed access to a top mounted interface controls on the mobile device and further pivots to a second position substantially orthogonal to the first position enabling access to both the top interface and to a rear interface of the mobile device, the second housing having an opening to a front side of the mobile device and the second housing having a slot located on a bottom portion to enable finger biased removal of the mobile device;
   a retention tab coupled to a top portion of the first housing for retaining the mobile device within the carry holder and for retaining the mobile device in the first position without restricting access to the top mounted interface controls; and
   the first and second housings providing an open area enabling access to side controls on the mobile device, the first and second positions thereby providing access to all planes of the mobile device.

2. The multi-mode pivoting carry holder of claim 1, wherein the opening in the second housing further comprises audio port vents.

3. The multi-mode pivoting carry holder of claim 1, wherein the carry holder further comprises a detent stop feature enabling the second housing to pivot at least partially toward the second position after the retention tab releases the mobile device.

4. The multi-mode pivoting carry holder of claim 1, wherein the mobile device is a clipless radio having a speaker on the front side, a display and keypad on a rear side and a plurality of top mounted controls on the top interface.

5. A multi-mode pivoting carry holder for a clipless mobile device having at least a speaker on a front side and a display and keypad on a rear side, comprising:
   a first housing having a belt clip for mounting to a person's body;
   a second housing pivotably coupled to the first housing, wherein the second housing receives the clipless mobile device through a top opening aperture and carries the clipless mobile device in at least a first position enabling unobstructed access to a top mounted interface controls on the mobile device and further pivots to a second position substantially ninety (90) degrees from the first position enabling tactile and visual access to both the top mounted interface controls and to the display and keypad on the rear side of the mobile device, the second housing having an opening to a front side of the clipless mobile device, and the second housing having a slot located on a bottom portion to enable finger biased removal of the clipless mobile device;

a retention tab coupled to a top portion of the first housing for retaining the clipless mobile device within the carry holder and for retaining the clipless mobile device in the first position without restricting access to the top mounted interface controls; and the first and second housings providing an open area enabling access to side controls on the clipless mobile device, the first and second positions thereby providing access to all planes of the clipless mobile device.

6. The multi-mode pivoting carry holder of claim 5, wherein the opening on the second housing comprises audio port vents that covers the speaker on the front side of the mobile device.

7. The multi-mode pivoting carry holder of claim 5, wherein the carry holder further comprises a detent stop feature enabling the second housing to pivot at least partially toward the second position after the retention tab releases the mobile device.

8. A holster for carrying an electronic product having at least a display and keypad on a rear side of the electronic product, comprising:

a first housing having a mounting mechanism for mounting to a person's body;

a second housing pivotably coupled to the first housing, wherein the second housing receives the electronic product through a top opening aperture and carries the electronic product securely in at least a first position enabling unobstructed access to a top mounted interface controls on the electronic product and further pivots to a second position substantially ninety (90) degrees from the first position enabling tactile and visual access to both the top mounted interface controls and to the display and keypad on the rear side of the electronic product, the second housing having an opening to a front side of the electronic product and the second housing having a slot located on a bottom portion to enable finger biased removal of the electronic product;

a retention tab coupled to a top portion of the first housing for retaining the electronic product within the holster and for retaining the electronic product in the first position without restricting access to the top mounted interface controls; and the first and second housings providing an open area enabling access to side controls on the electronic product, the first and second positions thereby providing access to all planes of the electronic product.

9. The holster of claim 8, wherein the opening on the second housing comprises an audio port vent that provides a port for a speaker on a front side of the electronic product.

10. The holster of claim 8, wherein the holster further comprises a detent stop feature enabling the second housing to pivot at least partially toward the second position after the retention tab releases the electronic product.

* * * * *